(12) United States Patent
Joyce et al.

(10) Patent No.: US 9,126,570 B2
(45) Date of Patent: Sep. 8, 2015

(54) CONTROL OF HYDRAULIC BRAKE SYSTEM AND METHOD

(71) Applicant: Ford Global Technologies, LLC, Dearborn, MI (US)

(72) Inventors: John P. Joyce, West Bloomfield, MI (US); Dale Scott Crombez, Livonia, MI (US); Daniel A. Gabor, Canton, MI (US); John Phillip McCormick, Milford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 226 days.

(21) Appl. No.: 13/803,842

(22) Filed: Mar. 14, 2013

(65) Prior Publication Data

US 2014/0265543 A1    Sep. 18, 2014

(51) Int. Cl.
*B60T 8/44* (2006.01)
*B60T 7/04* (2006.01)
*B60T 13/14* (2006.01)
*B60T 13/66* (2006.01)
*B60T 13/68* (2006.01)

(52) U.S. Cl.
CPC ............... *B60T 7/042* (2013.01); *B60T 13/146* (2013.01); *B60T 13/662* (2013.01); *B60T 13/686* (2013.01)

(58) Field of Classification Search
CPC ... B60T 13/146; B60T 13/161; B60T 13/662; B60T 7/042; B60T 13/686

USPC .............. 303/114.3, 10, 11, 12, 113.1, 113.2, 303/113.3, 113.4, 115.1, 115.2, 115.3
See application file for complete search history.

(56) References Cited

U.S. PATENT DOCUMENTS

| 5,938,297 | A | * | 8/1999 | Whaite et al. .............. 303/114.3 |
| 5,941,608 | A | | 8/1999 | Campau |
| 6,024,423 | A | | 2/2000 | Reuter |
| 7,232,192 | B2 | | 6/2007 | Teslak |
| 8,317,272 | B2 | * | 11/2012 | Favaretto ....................... 303/151 |
| 8,366,203 | B2 | | 2/2013 | Joyce |
| 2002/0130550 | A1 | | 9/2002 | Roden |
| 2006/0284477 | A1 | | 12/2006 | Yang |
| 2011/0160971 | A1 | | 6/2011 | Crombez |
| 2012/0256476 | A1 | | 10/2012 | Kunz |

FOREIGN PATENT DOCUMENTS

WO        97/37878 A1    10/1997

* cited by examiner

*Primary Examiner* — Pamela Rodriguez
(74) *Attorney, Agent, or Firm* — David B. Kelley; Brooks Kushman P.C.

(57) ABSTRACT

A hybrid or electric vehicle includes a hydraulic brake system having an active vacuum booster with an active boost control valve actuated by at least one controller. An isolation valve is disposed in a fluid circuit that fluidly connects a master cylinder to hydraulic brakes. A brake pedal is capable of moving in an initial deadband displacement range when initially depressed by an operator of the vehicle. While in the initial deadband displacement range, the controller selectively activates the isolation valve to inhibit fluid flow from at least a portion of the fluid circuit to the master cylinder based at least upon an operating state of the active boost control valve.

20 Claims, 3 Drawing Sheets

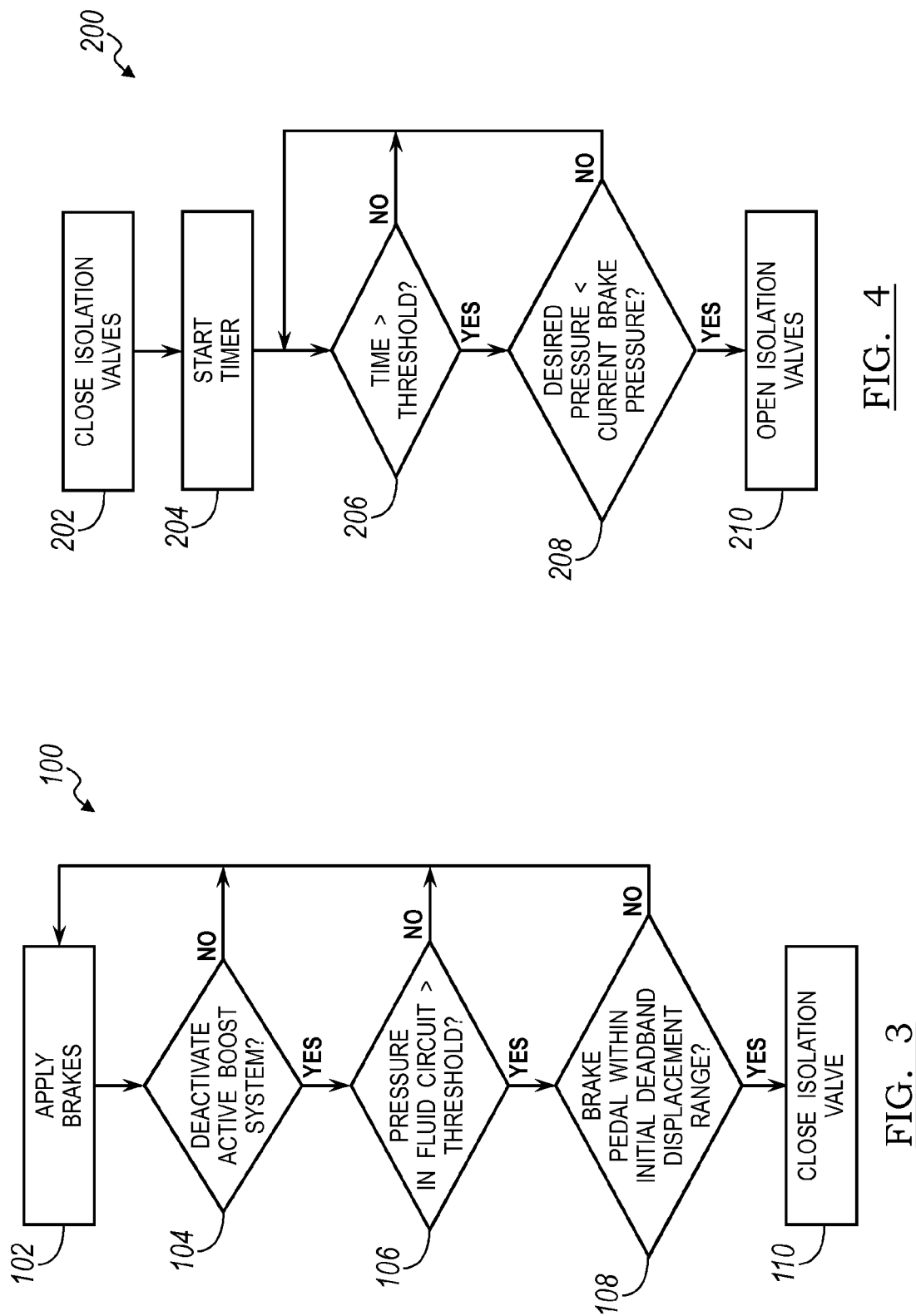

CONTROL OF HYDRAULIC BRAKE SYSTEM AND METHOD

TECHNICAL FIELD

The present disclosure relates to control of a hydraulic brake system, and more particularly to control of a hydraulic fluid pressure at wheel brakes in a hybrid-electric or battery-electric vehicle that includes a vacuum booster.

BACKGROUND

Vehicles may be equipped with a brake system configured to supply hydraulic fluid to brakes at a plurality of wheels. This is known as a hydraulic brake system. Hydraulic brake systems typically include a vacuum booster coupled to a brake pedal to provide an additional boost of force to assist in the application of the hydraulic fluid to the brakes in response to brake pedal displacement. An internal combustion engine may provide as the source of vacuum to the vacuum booster.

Active vacuum boosters are a type of vacuum boosters that include a valve or other controllable mechanism to provide the booster with a vacuum force even without sufficient brake pedal displacement. A vacuum pump may provide as a source of vacuum to the active vacuum booster. Hybrid electric vehicles (HEVs) and battery electric vehicles (BEVs) may also include regenerative brake systems in which kinetic energy from the wheels is absorbed through the powertrain of the vehicle and stored in a high voltage battery. The hydraulic brake system and regenerative brake system in HEVs and BEVs are coordinated to supply desired braking forces to the wheels of the vehicles.

SUMMARY

According to one embodiment, a braking system in a hybrid vehicle is provided. A brake pedal operates wheel brakes due to depression of the brake pedal. The brake pedal has a range of pedal displacement that includes an initial deadband displacement range. A master cylinder is configured to supply hydraulic fluid to the wheel brakes. A vacuum booster includes an active boost control valve. The vacuum booster is coupled to the brake pedal and the master cylinder and is capable of providing an active boost control force to the master cylinder. The vacuum booster is capable of providing the active boost control force when the brake pedal is displaced in the deadband displacement range, in which no mechanical force is transmitted from the pedal into the master cylinder. A rod couples the brake pedal to the active vacuum booster for transmitting a force from the brake pedal to the master cylinder in response to displacement of the brake pedal past the initial deadband displacement range. A fluid circuit fluidly connects the master cylinder to the wheel brakes. At least one controller is provided and is programmed to selectively activate a one-way isolation valve disposed in the fluid circuit to inhibit fluid flow from at least a portion of the fluid circuit to the master cylinder based at least upon an operating state of the active boost control valve.

According to another embodiment, a hybrid vehicle braking system includes a vacuum booster having an active boost control valve. A hydraulic brake fluid circuit provides a flow path for hydraulic fluid to provide fluid pressure to wheels of the vehicle. An isolation valve is disposed in the hydraulic brake fluid circuit. At least one controller is programmed to close the isolation valve based at least upon an operation condition of the boost control valve.

According to yet another embodiment, a method of controlling a braking system in a hybrid vehicle is provided. The method includes selectively inhibiting fluid flow from at least a portion of a hydraulic fluid circuit to a master cylinder in response to a deactivation of an active booster control valve to inhibit loss of fluid pressure in the portion of the fluid circuit. The selectively inhibiting may include selectively closing a one-way isolation valve disposed in the fluid circuit.

BRIEF DESCRIPTION OF THE DRAWINGS

FIG. 3 is a flow chart of an illustrative algorithm for controlling an isolation valve disposed in a fluid circuit; and FIG. 4 is another flow chart of an illustrative algorithm for controlling an isolation valve disposed in a fluid circuit.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
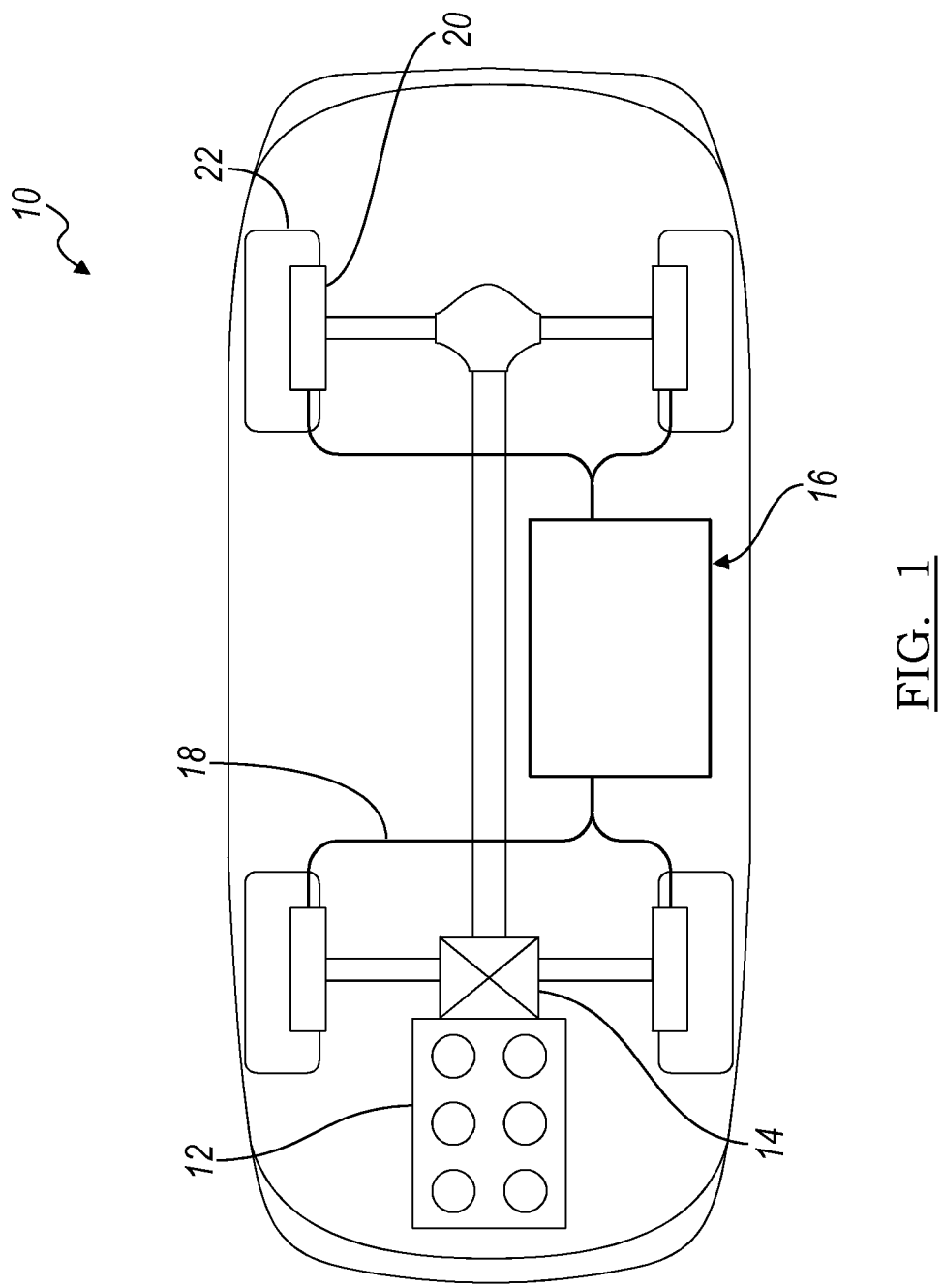
FIG. 1 is a schematic diagram of a hybrid vehicle equipped with a hydraulic brake system.

Referring to FIG. 1, a vehicle 10 is illustrated according to one or more embodiments of the present disclosure. The vehicle 10 shown is a hybrid electric vehicle (HEV) that includes an engine 12 and an electric motor, or electric machine 14, each capable of providing propulsion force to the vehicle 10. A high voltage electric traction battery (not shown) is electrically connected to the electric machine 14 for providing electric power to the electric machine 14 and for storing electric energy derived from regenerative braking, for example. For purposes of the present disclosure, it should be understood that while the vehicle 10 is illustrated as an HEV, the vehicle 10 may also be a battery electric vehicle (BEV) in which an internal combustion engine is not provided, or a plug-in hybrid electric vehicle (PHEV). Furthermore, while the vehicle 10 of FIG. 1 shows the engine 12 and electric machine 14 in series, the vehicle 10 may be a parallel-hybrid or any other hybrid configuration known in the art.

A hydraulic brake system 16 is provided, the details of which are provided below with reference to FIG. 2. The hydraulic brake system 16 provides hydraulic fluid through fluid lines 18 to actuate hydraulic friction brakes, or brakes 20. The brakes 20, when activated by fluid pressure, provide friction to the wheels 22 to slow or stop the wheels 22 from rotating. Electric braking or regenerative braking units (not shown) may also be provided at the wheels 22 to brake the wheels 22 via the powertrain through a regenerative brake system, as known in the art. Each wheel 22 may be provided with at least one of the hydraulic friction brake 20, an electronic brake, or neither brake according to various embodiments.

Figure 2:
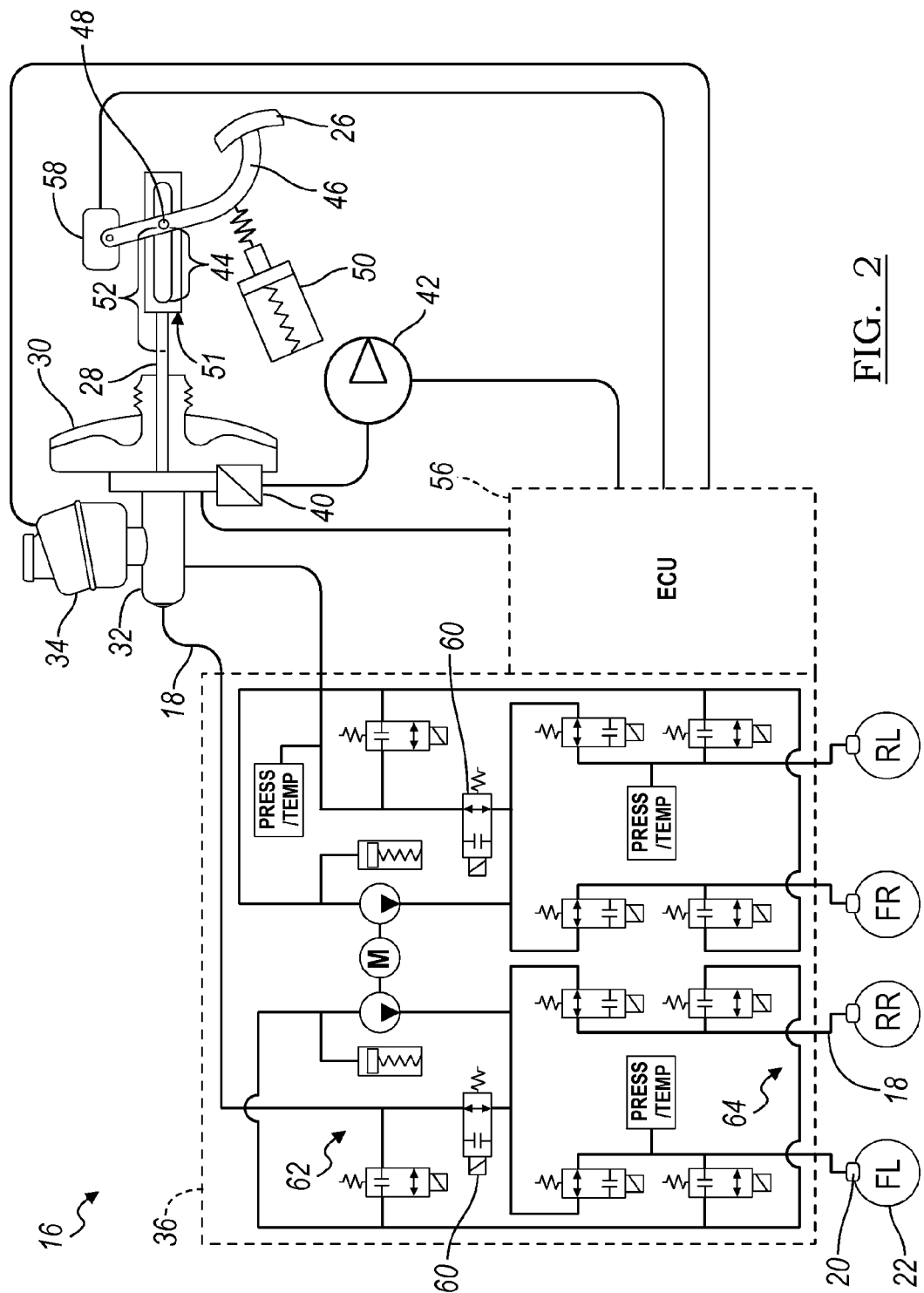
FIG. 2 is a schematic diagram of a hydraulic brake system having an active vacuum booster.

Referring to FIG. 2, the hydraulic brake system 16 is shown in detail. A brake pedal 26 is provided for operation by an occupant of the vehicle 10 to actuate the brakes 20. Movement of the brake pedal 26 can linearly displace an input rod 28 that is coupled to a vacuum booster 30. The input rod 28 (or another rod coupled thereto) is also at least partially disposed within a master cylinder 32. A fluid reservoir 34 supplies hydraulic fluid to the master cylinder 32 to be distributed throughout the fluid lines 18. Linear displacement of the input rod 28 moves a plunger or similar mechanical device within the master cylinder 32, thereby increasing hydraulic pressure within the fluid lines 18 and at the brakes 20. The vacuum booster 30 utilizes vacuum force to assist in the displacement of the input rod 28, which reduces the amount of brake pedal force necessary by the occupant of the vehicle to brake the wheels 22. A fluid circuit 36 may be in fluid communication with the master cylinder 32 to provide hydraulic pressure to the brakes 20. The fluid circuit 36 includes a plurality of valves and pumps, as will be subsequently described.

The vacuum booster 30 may be a conventional vacuum booster, in which the engine 12 is in fluid communication with the vacuum booster 30. In this fashion, combustion in the engine 12 creates a vacuum force that acts as the vacuum source for the vacuum booster 30. A seal or valve in the vacuum booster 30 may be provided and opened by application from the input rod 28 such that the vacuum force is supplied in response to the movement of the input rod 28 past a threshold distance.

The vacuum booster 30 may also be an active vacuum booster, in which an active boost control valve 40 is provided. The active boost control valve 40 is fluidly connected to a vacuum pump 42 that acts as the vacuum source for the vacuum booster 30. This configuration of having an active booster may be particularly beneficial for vehicles that can be propelled with the engine 12 disabled (e.g., an HEV, a PHEV, etc.), or for vehicles that may not have an engine 12 (e.g., a BEV). In those vehicles, the vacuum pump 42 can selectively supply a vacuum force to the vacuum booster 30 when the vehicle 10 does not have an engine 12 that is combusting and therefore creating a vacuum force.

In a HEV, PHEV or BEV (for example), electric braking or regenerative braking may be utilized in combination with the hydraulic brake system 16. When an operator applies a relatively small amount of brake pedal pressure, it may be desirable for efficiency purposes to utilize regenerative braking at the wheels 22 while little or no braking is provided from the hydraulic brake system 16. For these and other reasons, a gap 44 may be provided between an arm 46 of the brake pedal 26 and an end portion of the input rod 28. As the brake pedal 26 depresses, the arm 46 of the pedal 26 pivots about a pivot point. A translational member 48, such as a pin or ball, is formed or mounted on the arm 46. As the arm 46 pivots or angularly moves, the translational member 48 translates the pivot or angular movement of the arm 46 into linear movement by sliding or linearly moving through the gap 44 and along a groove or track, for example.

The gap 44 can also be referred to as a deadband space. The deadband space defines an initial deadband displacement range in which the brake pedal 26 can initially displace prior to applying force to the input rod 28. During movement of the brake pedal 26 in the initial deadband displacement range 44, electric braking or regenerative braking may occur in response to the position of the pedal 26, as will further be discussed. Furthermore, while in the initial deadband displacement range 44, the active boost control valve 40 may be actuated such that the hydraulic brake system 16 is operated using an active vacuum booster according to methods previously described. The hydraulic brake system 16 and the electric or regenerative brake systems can be coordinated and adjusted accordingly throughout a braking event, taking into consideration battery state of charge, desired brake force, and other factors.

While the pedal 26 is operated in the initial deadband displacement range 44 and electric or regenerative braking is applied, a brake pedal feel simulator 50 may provide a reaction force to the pedal 26 to provide the operator of the vehicle 10 with a pedal feel as though the hydraulic brakes 20 were being activated. The pedal feel simulator 50 may include a resistance band or spring for providing the reactionary force onto the pedal 26.

If the operator of the vehicle 10 demands a relative large amount of braking force, the brake pedal 26 may be depressed to the end of the initial deadband displacement range 44. Once the translational member 48 or a portion of the arm 46 reaches the end of the initial deadband displacement range 44, it applies a force on an end portion 51 of the input rod 28. This translates the input rod 28 through the vacuum booster 30 to operate the hydraulic brake system 16 according to methods previously described.

In short, during a braking event, the brake pedal 26 initially translates through an initial deadband displacement range 44, during which the active boost control valve 40 may be actuated to provide hydraulic braking, and electric or regenerative braking may similarly be applied. Once the brake pedal 26 moves to the end of the initial deadband displacement range 44, the brake pedal 26 transfers a force onto the input rod 28 to provide additional fluid pressure with assistance from the vacuum booster 30. The brake pedal 26 can continue to be depressed past the initial deadband displacement range 44 and all the way through an entire pedal displacement range 52.

An electronic control unit (ECU) 56 may be electrically connected to a pedal position sensor 58. The ECU 56 is additionally connected to the various valves, pumps and other control components within the fluid circuit 36 to control the hydraulic fluid pressure therein. The ECU 56 detects the position of the brake pedal 26 and correspondingly controls the components in the fluid circuit 36 to apply hydraulic pressure to the brakes 20. In short, the ECU 56 may be programmed to control the operation of components within the hydraulic brake system 16. While references herein are made to an ECU 56, it should be understood that this may also refer to any other combination of one or more controllers within the vehicle 10.

When the active boost control valve 40 is commanded to be open or active such that the vacuum booster 30 is operating as an active vacuum booster, any interruptions in the ability to control the active boost control valve 40 are undesirable. For example, if the brake pedal 26 is depressed within the initial deadband displacement range 44, an inability to properly control the active boost control valve 40 can result in a loss of brake hydraulic brake pressure at the brakes 20. The inability to properly control the active boost control valve 40 may be caused by, for example, an inability to receive proper readings from a transducer in the vacuum booster 30, an inability to receive proper readings from the pedal position sensor 58, an inability to properly control the vacuum pump 42, or an inability to actuate a solenoid or actuator in the vacuum booster 30. Any such hindrance in the control of the active boost control valve 40 can cause the ECU 56 to disable or shut down the active boost control valve 40.

A shutdown or disablement of the active boost control valve 40 while the brake pedal 26 is depressed within the initial deadband displacement range 44 could cause a loss of hydraulic pressure in the fluid circuit 36 and at the hydraulic brakes 20. One or more isolation valves 60 are therefore disposed within the fluid circuit 36. The operation of the isolation valves 60 are controlled by the ECU 56. When activated by the ECU 56, the isolation valves 60 operate as a one-way valve to prevent hydraulic fluid from passing from an upstream portion 62 to a downstream portion 64 of the fluid circuit 36. This inhibits a loss of hydraulic brake pressure at the hydraulic brakes 20 such that a minimum brake pressure is maintained at the brakes 20 in response to the inability to properly control the active vacuum booster 30, or in response to the operating state (ON/OFF) of the active vacuum booster 30.

Since the isolation valves 60 may be one-way valves, additional hydraulic pressure may be added to, but not removed from, the downstream portion 64 of the fluid circuit 36. In order to do so, the operator of the vehicle can depress the brake pedal 26 past the initial deadband displacement range 44 such that the input rod 28 is laterally translated. This activates the vacuum booster 30 in the conventional fashion, adding more hydraulic pressure from the master cylinder 32 into the fluid circuit 36 and toward the brakes 20.

Once the brake pedal 26 is depressed past the initial deadband displacement range 44, if an inability to control the vacuum pump 42 is detected that caused the inability to control the active boost control valve 40, the engine 12 (if equipped in the vehicle 10) may be activated to supply a source of vacuum to the vacuum booster 30.

Referring to FIG. 3, and keeping reference to the components of FIGS. 1-2, an algorithm 100 to be executed by the ECU 56 for operating the isolation valves 60 is illustrated. At operation 102, the operator of the vehicle 10 depresses the brake pedal 26, indicating to the ECU 56 the desire to actuate the brakes 20 at the wheels 22. At operation 104, the ECU 56 continuously checks whether the sensors and circuitry throughout the hydraulic brake system 16 indicate a deactivation or inability to perform proper control of the active boost system according to methods previously described. For example, as previously discussed, the ECU 56 may lose the ability to sense the pressure in the active vacuum booster 30, thus inhibiting proper control of the active boost control valve 40.

If an inability to properly control the active boost system is detected, the ECU 56 may determine the amount of pressure within the fluid circuit 36 at operation 106. If the pressure in the fluid circuit 36 is above a threshold (e.g., any pressure amount greater than 0 psi), the method continues to operation 108. At operation 108, the ECU 56 determines whether the brake pedal 26 is operating within the initial deadband displacement range 44, such that the operator is providing some amount of hydraulic braking assisted by the operation of the active boost control valve 40 in the vacuum booster 30. If the continuous checks performed in operations 102-108 results in a YES, at least one isolation valve 60 is actuated by the ECU 56 to close, preventing a brake pressure loss at the hydraulic brakes 20.

Referring to FIG. 4, and keeping reference to the components of FIGS. 1-2, another algorithm 200 to be executed by the ECU 56 for operating the isolation valves 60 is illustrated. The algorithm 200 proceeds after the closure of the isolation valves 60 at operation 110 of FIG. 3. The closure of the isolation valves 60 is again illustrated at operation 202.

Upon the closure of the isolation valves 60, a timer is started at operation 204. The time after the closure of the isolation valves 60 is compared to a predetermined time threshold (e.g., 2 seconds) at operation 206. A desired brake pressure is determined by the ECU 56 at operation 208. The desired brake pressure indicates the amount of brake pressure desired by the operator of the vehicle 10, as indicated by the brake pedal position sensor 58, for example. The desired brake pressure is compared to the current brake pressure that is isolated in the downstream portion 64 and at the wheel brakes 20. If the desired brake pressure is less than the current brake pressure, this indicates a desire for less brake pressure at the wheels brakes 20. The isolation valves are therefore opened at operation 210 to enable the hydraulic fluid to flow from the downstream portion 64, through the isolation valve 60 and toward the master cylinder 32.

The utilization of the timer along with the brake pressure comparison assures ample time is given to continuously check for signals that would indicate an inability to control the active boost control valve 40. If the first sensed inability to control the active boost control valve 40 is determined to be relatively minor and the inability is diminished quickly, the ECU 56 will allow the brake pressure to return to its desired value after being held within the downstream portion 64 for at least the time threshold.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A braking system in a hybrid vehicle, comprising:
   a brake pedal for operating wheel brakes, the pedal having a range of pedal displacement including an initial deadband displacement range;
   a master cylinder configured to supply hydraulic fluid to the wheel brakes;
   a vacuum booster having an active boost control valve, the vacuum booster coupled to the brake pedal and the master cylinder and capable of providing an active boost control force to the master cylinder while the brake pedal is displaced within the initial deadband displacement range;
   a rod coupling the brake pedal to the vacuum booster for transmitting a force from the brake pedal to the master cylinder in response to displacement of the brake pedal past the initial deadband displacement range;
   a fluid circuit fluidly connecting the master cylinder to the wheel brakes; and
   at least one controller programmed to selectively inhibit fluid flow from at least a portion of the fluid circuit to the master cylinder based at least upon an operating state of the active boost control valve.

2. The braking system of claim 1, further comprising a one-way valve disposed within the fluid circuit and controlled by the at least one controller such that activation of the one-way valve inhibits fluid flow from the portion of the fluid circuit to the master cylinder.

3. The braking system of claim 2, wherein the at least one controller is further programmed to activate the one-way valve additionally based upon the brake pedal being displaced within the initial deadband displacement range.

4. The braking system of claim 2, wherein the one-way valve enables additional fluid pressure to be applied to the portion of the fluid circuit while the controller inhibits fluid flow from the portion of the fluid circuit to the master cylinder.

5. The braking system of claim 2, wherein the at least one controller is further programmed to deactivate the one-way valve based at least upon (i) a time after the activation of the one-way valve exceeds a time threshold, and (ii) fluid pressure maintained at the wheel brakes exceeds a desired fluid pressure at the wheel brakes.

6. The braking system of claim 1, further comprising a translational member secured to an arm of the brake pedal for converting angular movement of the brake pedal to linear movement, wherein the initial deadband displacement range is defined as a gap between an end portion of the rod and the translational member.

7. The braking system of claim 6, further comprising a brake pedal feel simulator that resists movement of the brake pedal while the brake pedal is displaced in the initial deadband displacement range.

8. The braking system of claim 1, wherein the operation state of the active boost control valve is defined by at least one of an operating state of a transducer in the vacuum booster, an operating state of a pump connected to the vacuum booster, and an operating state of a brake pedal angle position sensor.

9. A vehicle comprising:
   a brake pedal operable in a deadband-displacement range (DDR);
   a vacuum booster having an active boost control valve and capable of providing boost force while the brake pedal is in the DDR;
   an isolation valve disposed in a hydraulic brake fluid circuit; and
   a controller programmed to close the isolation valve based upon an unexpected operating condition of the active boost control valve while the brake pedal is in the DDR.

10. The vehicle of claim 9, wherein the controller is further programmed to close the isolation valve further based upon a fluid pressure in the hydraulic brake fluid circuit exceeding a threshold.

11. The vehicle of claim 9, further comprising a master cylinder, and an input rod configured to transmit applied force from the brake pedal to the master cylinder via a linear translational member, wherein the DDR defines a gap between an end portion of the input rod and the translational member.

12. The vehicle of claim 11, further comprising a brake pedal feel simulator that resists movement of the brake pedal while the brake pedal is displaced in the DDR.

13. The vehicle of claim 9, wherein the isolation valve is a one-way valve that enables hydraulic fluid to flow through the isolation valve and into a portion of the hydraulic brake fluid circuit in response to brake pedal displacement.

14. The vehicle of claim 9, wherein the controller is further programmed to open the isolation valve based at least upon (i) a time after the closing of the isolation valve exceeding a time threshold, and (ii) a fluid pressure within at least a portion of the hydraulic brake fluid circuit exceeding a desired fluid pressure.

15. The vehicle of claim 9, wherein the operating condition of the active boost control valve is defined by at least one of an operating condition of a transducer in the vacuum booster and an operating condition of a brake pedal angle position sensor.

16. A method of controlling a braking system in a vehicle having a brake pedal operable in a deadband displacement range, comprising:
   selectively inhibiting fluid flow from at least a portion of a hydraulic fluid circuit to a master cylinder in response to an unexpected deactivation of an active booster control valve while a brake pedal is in the deadband displacement range to inhibit loss of fluid pressure in the portion of the fluid circuit.

17. The method of claim 16, wherein the selectively inhibiting comprises controlling an isolation valve disposed in the fluid circuit.

18. The method of claim 16, further comprising deactivating the active booster control valve based upon an operating condition of a pedal position sensor.

19. The method of claim 16, further comprising deactivating the active booster control valve based upon an operating condition of a transducer in a vacuum booster.

20. The method of claim 16, wherein the selectively inhibiting comprises closing an isolation valve, the method further comprising opening the isolation valve in response to (i) a time after the closing of the isolation valve exceeding a time threshold, and (ii) a fluid pressure in the portion of the hydraulic fluid circuit exceeding a desired fluid pressure at the wheel brakes.

* * * * *